Oct. 16, 1962   R. C. NESSELBUSH ETAL   3,058,482
REGULATOR SYSTEM FOR CONTROLLING THE FLOW
OF TWO INDEPENDENT FLUIDS
Filed Oct. 28, 1958
FIG. 1
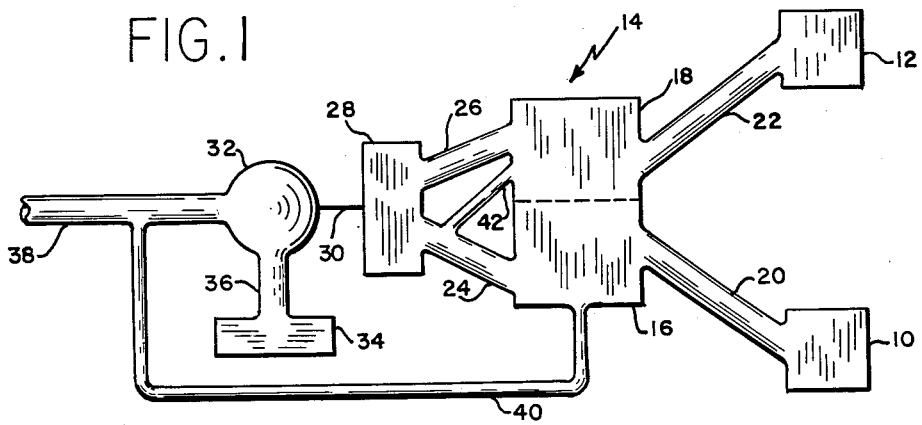
FIG. 3
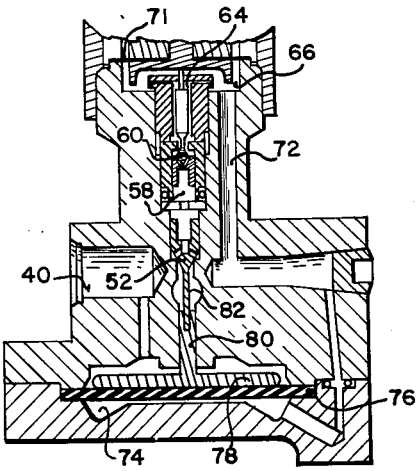
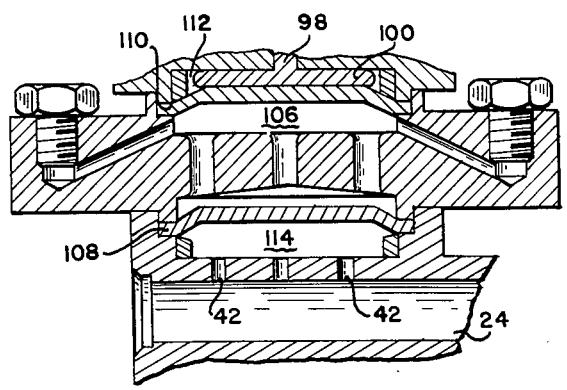
FIG. 4
INVENTORS.
ROBERT C. NESSELBUSH
CLEMENT J. TURANSKY
BY
ATTORNEYS United States Patent Office 3,058,482
Patented Oct. 16, 1962

3,058,482
REGULATOR SYSTEM FOR CONTROLLING THE FLOW OF TWO INDEPENDENT FLUIDS
Robert C. Nesselbush, Utica, Mich., and Clement J. Turansky, Tonawanda, N.Y., assignors to the United States of America as represented by the Secretary of the Air Force
Filed Oct. 28, 1958, Ser. No. 770,244
4 Claims. (Cl. 137—95)

This invention relates to a regulator system, and is more particularly concerned with a system for controlling the flow of two independent fluids in response to a single, sensed condition.

When two fluids flow from independent sources to a single point of use, it is often desirable to have accurate, coordinated control of both at some position upstream of said point. One example might be the case of supplying a fuel and an oxidizer to a prime mover. Another could be the supply of two different chemical reagents to a mixing chamber. In all such cases, control of both fluids is required to maintain a preselected condition at the point of use or beyond. The condition to which the device responds may be pressure, temperature, concentration, humidity, etc.

It is a primary object of this invention to provide an improved regulator system capable of controlling two such independent sources.

More specifically, it is an object of this invention to provide a more sensitive and stable response to a sensed condition.

Another object of the invention is to provide a two-fluid system wherein the regulating mechanism is of unitary construction, and permits simplified repair or replacement of parts.

The above and still other objects, advantages, and features of our invention will become apparent upon consideration of the following detailed description of one embodiment thereof, especially when taken in conjunction with the accompanying drawings, in which:

FIGURE 1 is a block diagrammatic view of one type of system employing our invention;

FIGURE 3 is a vertical section through a portion of the fuel regulator taken from a different location than that of FIGURE 2; and FIGURE 4 is a vertical section through a modification of the sensing means of the oxidizer regulator.

Figure 2:
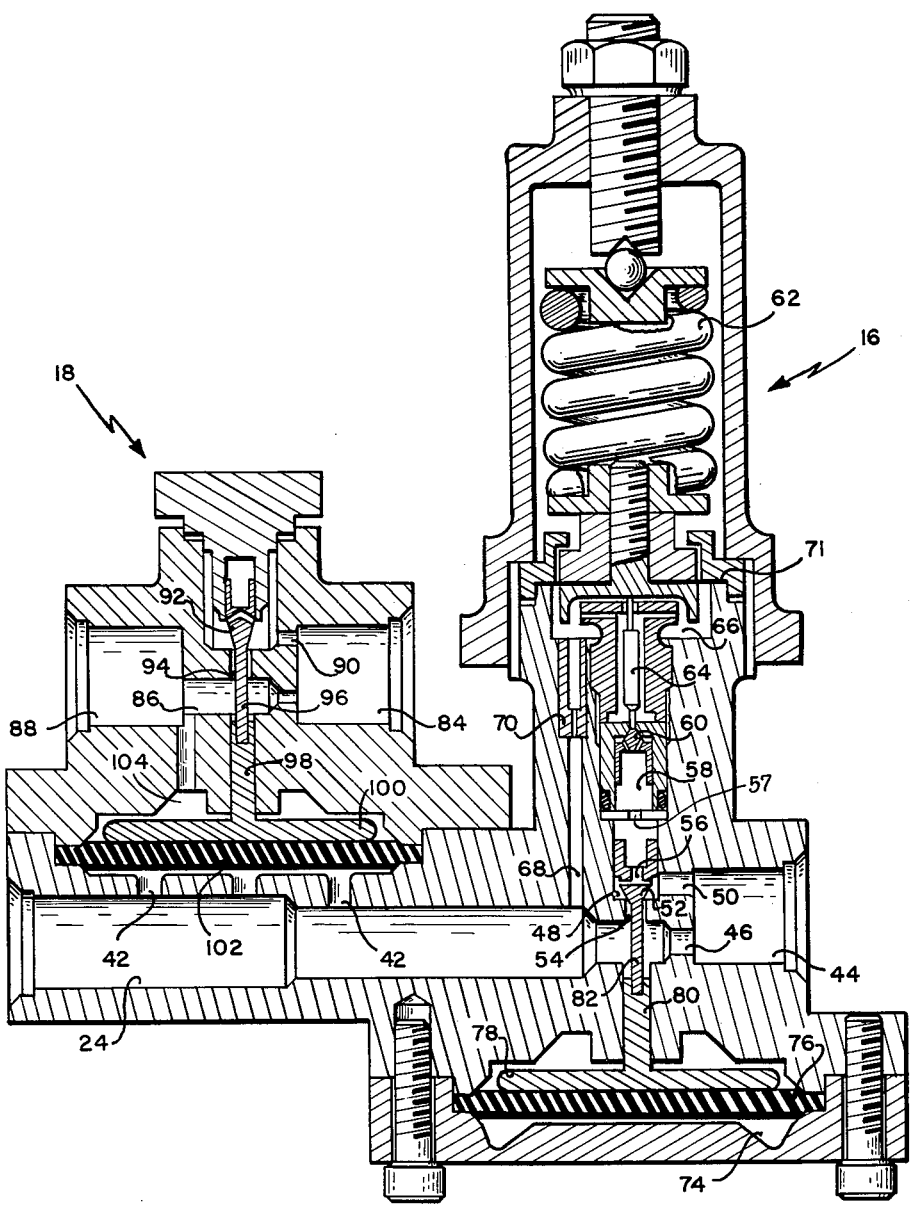
FIGURE 2 is a vertical section through a complete regulator system in accordance with the invention.

Throughout the drawings like characters of reference indicate like parts. The apparatus shown in FIGURE 1 represents a system for controlling the output pressure of a motor-driven pump by regulating the supply of the propellants which actuate the motor. Specifically a source of fuel is indicated at 10 and a source of oxidizer at 12. The regulator system of this invention is generally shown at 14, and comprises a fuel section 16 and an oxidixer section 18. Lines 20 and 22 conduct the fuel and the oxidizer respectively from their sources to their individual regulator sections. From said sections, the fuel and the oxidizer pass through lines 24 and 26 to a motor 28 wherein they are mixed and serve as propellants. By means of a mechanical linkage 30, the motor 28 drives a pump 32. The latter draws fluid from a sump 34 through a line 36, and said fluid is discharged through another line 38. Downstream pump pressure is transmitted to the fuel section 16 of the regulator system through a line 40. Pressure downstream of said fuel section is transmitted to the oxidizer section 16 by means of a passage 42.

Turning to FIGURE 2, the fuel section 16 has an inlet 44 which is adapted to be connected to the line 20. From inlet 44 the fuel is divided and travels two paths. The major portion of said fuel passes through a fixed orifice 46 and on into the line 24 leading to the motor 28. The remainder of said fuel enters a valved chamber 48 through a passage 50. A valve 52 in said chamber controls an opening 54 which leads to the line 24. While the major portion of the fuel which enters the chamber 48 returns to the line 24 through the valve 52, a minor amount thereof is directed through a series of passages 56 and 57 in said valve.

From passages 56 and 57, the fuel passes to a second valved chamber 58 which is controlled by a valve 60. This valve is biased to an open position by an adjustable spring 62 acting through a push-rod 64. When fuel flows past the valve 60 and around the rod 64, it enters a chamber 66. A passage 68 connects said chamber 66 with the line 24. A metering orifice 70 in the passage 68 limits the rate of fuel flow through said passage. At its upper end, the chamber 66 is sealed by a flexible diaphragm 71.

As seen in FIGURE 3, a passage 72 also leads away from the chamber 66. Fuel is conducted through said passage to a chamber 74 which is located below the valve passage 52 in the chamber 48. The chamber 74 is divided by a flexible diaphragm 76, one surface of which is exposed to the fuel entering through the passage 72. The opposite surface of said diaphragm is acted on by fluid at pump outlet pressure. This is accomplished through the line 40 which leads to the chamber 74 from the downstream side of the pump 32. A follower 78 moves with the diaphragm 76, and a stem 80 on said follower has an operative connection to a depending stem 82 on the valve 52. The flow through biased valve 60 is used to obtain a constant reference pressure in chamber 74 and is connected thereto by means of passage 72. The adjustable spring 62 is used to set the desired pressure.

The oxidizer section 18 has an inlet 84 which is adapted for connection to the line 22 leading from the oxidizer supply. Fluid entering this inlet is divided, and a major portion flows through a passage 86 and into an outlet 88. The latter is adapted for connection with the line 26 leading to the motor 28. The remainder of the oxidizer flows through the port 90 into a chamber having a valve 92 therein. Said valve controls a passage 94 which leads to the passage 86 and the outlet 88. Depending from said valve 92 is a stem 96 which is operatively attached to a stem 98 on a diaphragm follower 100. A diaphragm 102 is mounted across a chamber 104 located within the oxidizer section 18. One side of said diaphragm is exposed to pressure in the oxidizer outlet 88 through the chamber 104. The opposite side of said diaphragm is acted on by pressure in the fuel section outlet. Passages 42 connect said last-named side with the line 24.

In the modification of FIGURE 4, a liquid link chamber 106 is provided in the oxidizer section. Said chamber is sealed between a pair of diaphragms 108 and 110. A chamber 112 receives fluid from the oxidizer outlet 88 while a chamber 114 receives fluid from the line 24. The primary advantage of this modified structure is that the fluid link formed by chamber 106 serves to damp sudden vibratory changes in pressure.

The operation of our inventive regulator system will now be described in detail. With the pump being operated by the motor 28, a constant pressure must be maintained in the pump outlet line 38. This is accomplished by regulating the supply of fuel and oxidizer, the propellants for the motor. Under normal conditions fuel flows from the source 10 through line 20 and into the inlet 44. It then divides with the major portion flowing through passage 46 and line 24 to the motor. At the same time, oxidizer flows from its source through line 22, inlet 84, passage 86, outlet 88 and line 26 to said motor. The valves 52 and 92 control the amount of fuel and oxidizer respectively which must be added to or subtracted from the main flow in order to keep the motor driving the pump 32 at the desired speed. Under normal conditions, each of these valves would be partially open.

Assuming that the pump outlet pressure drops below the desired value, it is apparent that the motor, and consequently said pump, must be speeded up. This is accomplished as follows. Lowered pressure in line 38 is transmitted to the chamber above diaphragm 76 via line 40. The resultant unbalance forces follower 78 upward. Valve 52 is opened wider through stems 80 and 82. Additional fuel is thus fed to the motor through line 24. The pressure increase therefrom is transmitted through the passages 42 to the diaphragm 102. The valve 92 is thereby forced to open wider, and an additional supply of oxidizer is also passed to the motor 28. The latter can thereby supply more power to the pump which in turn will rebuild its outlet pressure to the desired value.

When this increased pressure is transmitted to the chamber above diaphragm 76, it permits rebalance of the latter. The excess fluid below said diaphragm can then bleed out through the metering orifice 70. If an increase in pump outlet pressure had occurred and been overcome, additional fluid would be fed to the lower diaphragm chamber by opening of the valve 60. This valve is controlled by the adjustable spring 62 acting in opposition to fuel pressure on the diaphragm 71.

It is to be understood that the above-described arrangements are merely illustrative of the applications of the principles of our invention. Numerous other arrangements may be devised by those skilled in the art without departing from the spirit and scope of this invention.

What we claim is:

1. A system for controlling the flow of two fluids in response to a sensed condition, said system comprising two sources of fluids, a pair of pressure regulator systems each having an inlet and outlet, each pressure regulator system having its inlet connected with a source, means connected with the outlets of said pressure regulators for conducting said fluids from said pressure regulators, one of said pressure regulators having the flow from its source divided into two paths, one from its inlet to its outlet, the other path comprising first and second valves connected in parallel and with said inlet of said one of said pressure regulators, said first and second valves having outlets connecting with the outlet of said one of said pressure regulators, the second valve including spring biased pressure responsive means for controlling the second valve to establish a control pressure, a metering orifice interposed between said second valve and the outlet of said pressure regulator, a device responsive to a pressure differential operatively connected with said first valve, means connecting said control pressure with one side of said device, means connecting a sensed control pressure with the other side of said device such that the pressure differential controls the valve action of said first valve, the other of said pressure regulators having two paths between its inlet and outlet, one of said paths having a valve for controlling fluid flow from the inlet to the outlet, a second device responsive to a pressure differential operatively connected with said last-mentioned valve, means connected with one side of said device for sensing the pressure of the outlet of said other of said pressure regulators, and means connected with the outlet of said one of said regulators and the other side of said device such that the resultant pressure differential controls action of the valved chamber of the other of said pressure regulators.

2. A system as defined in claim 1 wherein said devices responsive to a pressure differential comprises a chamber divided by a diaphragm.

3. A system as defined in claim 2 including damping means connected with said second device.

4. A system as defined in claim 2 wherein the outlets of said pressure regulators are connected to a prime mover responsive to the fluid flow from said outlets.

References Cited in the file of this patent

UNITED STATES PATENTS

| | | |
|---|---|---|
| 1,452,265 | Collins | Apr. 17, 1923 |
| 2,009,659 | Hill | July 30, 1935 |
| 2,016,234 | Hughes | Oct. 1, 1935 |
| 2,178,974 | Smith et al. | Nov. 7, 1939 |
| 2,634,681 | Powell | Apr. 14, 1953 |
| 2,704,086 | Casali | Mar. 15, 1955 |
| 2,800,915 | Tavener | July 30, 1957 |
| 2,888,027 | Gerwig | May 26, 1959 |
| 2,966,120 | Morrow | Dec. 27, 1960 |